Dec. 6, 1927.
T. P. JACKSON
BULB CONTAINER
Filed Aug. 26, 1925
1,651,772
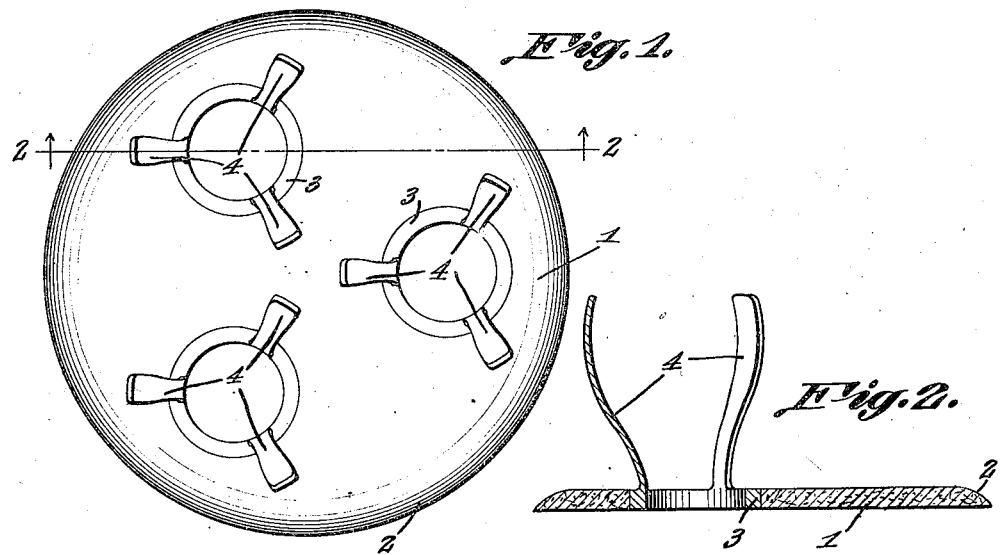
T. P. Jackson, INVENTOR.
BY
Geo. P. Kimmel, ATTORNEY.

Patented Dec. 6, 1927.

1,651,772

UNITED STATES PATENT OFFICE.

THELMA PUTNAM JACKSON, OF HOUSTON, TEXAS.

BULB CONTAINER.

Application filed August 26, 1925. Serial No. 52,602.

This invention relates to flower bulb holding devices for the support of growing bulb plants in bowls.

The primary object of this invention is the provision, in a manner as hereinafter set forth, of a means for supporting in up-right position one or a series of flower bulbs, in a bowl of water, in such a manner as to allow the roots of the bulb to grow and spread freely throughout the bowl and to also securely hold the bulb against accidental displacement from its position in the group.

Another object of the invention is the provision, in a manner as hereinafter set forth, of a means for holding flower bulbs in upright position in a bowl of water, so that the same can grow freely and at the same time be maintained in such a manner in the bowl that the growing process can be watched and studied.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claim.

In the drawing:—

Figure 1 is a top plan view of a plate or disc provided with a plurality of the bulb holders.

Figure 2 is a section taken upon the line 2—2 of Figure 1.

Referring now to the drawing in detail wherein like numerals of reference indicate corresponding parts throughout the several views, there are shown two types of bulb holders and the description will be first confined to the type disclosed in Figures 1 and 2.

In Figures 1 and 2 there is shown a flat circular plate providing a relatively large formation member 1 formed of glass, china, porcelain or any desired material. This plate is flat upon its under surface as shown and has its edge bevelled as indicated at 2. While there has been shown a circular plate, it is to be understood that the invention is not confined to a plate of this conformation, but these plates may be made of any desired shape or thickness.

Embedded in the formation member 1, during the molding of the same, is one or more annular members 3, the top and bottom surfaces of which are flush with the top and bottom surfaces of the plate 1 and set up an opening therethrough as shown. These annular members 3 each have formed integral therewith a plurality of up-standing resilient arms 4, which arms curve outwardly and upwardly from the ring concentrically of the opening in the base as shown and at their upper ends these arms curve inwardly to form a series of bulb grasping fingers and to better enable these arms to securely hold bulbs placed therebetween, the same are broadened as is shown.

While the drawing has shown the plate as having three of the annular members 3 embedded therein with the arms thereof extending upwardly therefrom, it is to be understood that the invention is not confined to such construction but the plate may be provided with one or any number of the annular resilient arm carrying members.

From the foregoing description it will be readily seen that bulbs placed between the broad upper ends of the spring arms 4 of the holders shown in Figures 1 and 2 will be securely held in up-right position and while in this position the roots of the bulbs will be unhindered in their growth. After, or before the bulbs have been thus placed between the arms the plate can be set in any receptacle containing water and be allowed to grow.

Having thus described my invention what I claim is:—

A flower bulb holder, comprising a relatively large foundation member made from composite material, an annular member embedded in said foundation member and setting up an opening therethrough, and a plurality of outwardly curved resilient bulb grasping arms carried by and extending upwardly from said member concentrically of the opening in the base.

In testimony whereof, I affix my signature hereto.

THELMA PUTNAM JACKSON.